(12) United States Patent
Kahle

(10) Patent No.: US 6,578,856 B2
(45) Date of Patent: Jun. 17, 2003

(54) COLLAPSIBLE PORTABLE SAW STAND

(76) Inventor: W. Scott Kahle, 1074 Rte. 6, Germantown, NY (US) 12526

( * ) Notice: Subject to any disclaimer, the term of this patent is extended or adjusted under 35 U.S.C. 154(b) by 1 day.

(21) Appl. No.: 09/749,334

(22) Filed: Dec. 27, 2000

(65) Prior Publication Data

US 2001/0047712 A1 Dec. 6, 2001

Related U.S. Application Data

(60) Provisional application No. 60/175,180, filed on Jan. 10, 2000.

(51) Int. Cl.$^7$ .............................. B62B 1/04; B62B 3/02; B26D 1/18; B25H 1/00; A47B 3/02
(52) U.S. Cl. ..................... 280/30; 83/477.2; 83/859; 83/574; 144/286.5; 108/119; 248/150
(58) Field of Search .................. 83/477.2, 859, 83/701, 928, 574; 451/361, 411; 144/286.1, 286.5; 108/12, 102, 132, 641, 11, 119; 280/41 R, 30; 248/150

(56) References Cited

U.S. PATENT DOCUMENTS

| | | | | | |
|---|---|---|---|---|---|
| 1,005,063 | A | * | 10/1911 | Nordstrom ..................... 280/46 |
| 3,082,016 | A | * | 3/1963 | Pratt ........................... 280/641 |
| 3,493,262 | A | * | 2/1970 | Ferneau ....................... 280/641 |
| 3,655,212 | A | * | 4/1972 | Krass et al. ................. 280/641 |
| 3,669,031 | A | * | 6/1972 | Cole ............................ 108/12 |
| 3,752,527 | A | * | 8/1973 | Ferneau et al. ............. 108/120 |
| 4,269,096 | A | * | 5/1981 | Boone .......................... 108/18 |
| 4,565,382 | A | * | 1/1986 | Sherman ...................... 108/18 |
| 4,611,823 | A | * | 9/1986 | Haas ........................... 108/119 |
| 4,640,326 | A | | 2/1987 | Hewitt |
| 4,682,750 | A | * | 7/1987 | Rudolph et al. ............ 108/147 |
| 4,714,028 | A | * | 12/1987 | Uredat-Neuhoff ........... 108/138 |
| 4,860,807 | A | | 8/1989 | Vacchiano |
| 4,934,718 | A | * | 6/1990 | Voegele ....................... 280/641 |
| 4,955,941 | A | | 9/1990 | Rousseau |
| 4,967,672 | A | * | 11/1990 | Leather ........................ 108/120 |
| 4,969,496 | A | * | 11/1990 | Romans ....................... 108/132 |
| 5,067,535 | A | * | 11/1991 | Wolff ........................... 144/1.1 |
| 5,080,387 | A | * | 1/1992 | Ryals .......................... 280/652 |
| 5,224,531 | A | * | 7/1993 | Blohm ......................... 108/110 |
| 5,277,439 | A | * | 1/1994 | Pipes et al. ................. 280/47.2 |
| 5,452,908 | A | | 9/1995 | Bencic |
| 5,462,102 | A | * | 10/1995 | Searfoss ................... 144/286.1 |
| 5,479,840 | A | * | 1/1996 | Hilliard et al. ............... 108/18 |
| 5,526,855 | A | * | 6/1996 | Graham ........................ 108/12 |
| 5,529,322 | A | * | 6/1996 | Barton .................. 108/147.11 |
| 5,603,491 | A | * | 2/1997 | Murrell ........................ 269/15 |
| 5,642,898 | A | * | 7/1997 | Wise ....................... 280/47.19 |
| 5,687,978 | A | * | 11/1997 | Rhodes et al. .............. 280/652 |
| 5,778,953 | A | * | 7/1998 | Braddock ................... 144/286 |
| 5,819,671 | A | * | 10/1998 | Ocampo ....................... 108/19 |
| 5,863,052 | A | * | 1/1999 | Roman ........................ 280/652 |
| 5,927,745 | A | * | 7/1999 | Cunningham ............... 108/119 |
| 6,152,462 | A | * | 11/2000 | Barrett ........................ 280/641 |
| 6,240,987 | B1 | * | 6/2001 | Birkeland .................... 108/69 |
| 6,349,962 | B1 | * | 2/2002 | Johanson .................... 280/651 |
| 6,371,495 | B2 | * | 4/2002 | Thompson ................... 280/30 |
| 6,386,557 | B1 | * | 5/2002 | Weldon ........................ 108/12 |
| 6,471,220 | B1 | * | 10/2002 | Babb ............................ 280/30 |
| 6,471,236 | B1 | * | 10/2002 | Eskridge ..................... 280/641 |

* cited by examiner

*Primary Examiner*—Allan N. Shoap
*Assistant Examiner*—Jason Prone
(74) *Attorney, Agent, or Firm*—Michael F. Hoffman; Hoffman, Warnick & D'Alessandro

(57) ABSTRACT

A collapsible stand for supporting a table top machining tool, e.g., a table saw. The stand comprises a lateral support structure, such as a platform for holding the tool; a secondary support frame having a first end pivotally attached to a first end the lateral support structure; and a main support frame pivotally attached to the secondary support frame, wherein the main support frame comprises a handle at a first end for transporting the stand in its collapsed position, and wherein the handle comprises an out feed support for the table saw when the stand is in its set up position.

20 Claims, 6 Drawing Sheets

COLLAPSIBLE PORTABLE SAW STAND

CROSS REFERENCES TO RELATED APPLICATIONS

This application claims the benefit of provisional patent application serial No. 60/175,180 filed on Jan. 10, 2000, entitled "Collapsable Portable Saw Stand."

BACKGROUND OF THE INVENTION

1. Field of Invention

This invention relates to a method and apparatus for supporting and carrying a portable table saw, particularly an apparatus that supports a table saw as well as the workpiece on the out-feed end of the table saw.

2. Description of Prior Art

It is desirable for anyone using a portable table saw to provide a safe and stable means of support from which to work, as well as the ease of mobility and convenience of portability. It is also desirable to quickly and easily set up and take down any apparatus employed to support the saw. This makes for convenience and efficiency for tradespeople as well as anyone else using the saw. Typically, users would carry the saw to the work place and then set up "on-the-fly" utilizing what ever temporary means that can be mustered up quickly. Not only is this practice inconvenient, it is unsafe.

Several manufacturers have designed and marketed apparatuses for supporting and/or transporting the saw. The problems with most of these designs are that they are not very portable. Nor do they provide the stability required of a table saw. Also, none of them provide a means for out-feed work support. The out-feed is that portion of the workpiece that has been run through the table saw as it comes off the rear of the table. Long pieces of wood being cut on a table saw can become cumbersome and unsafe as it is pushed through the blade as the weight on the out-feed section is usually unsupported. This unsupported weight tends to create a condition of unbalance and may cause the entire apparatus to tip.

TROJAN Manufacturing of Portland, Oreg. offers two such saw stands. U.S. Pat. No. 5,778,953 to Lawrence D. Braddock (Jul. 14, 1999) refers to TROJAN's RIPMASTER Table Saw Stand. This stand does have wheels for transports but it is not easily set up and taken down for transport. With the RIPMASTER, the operator must initiate several steps to put it together and take it apart each time it is to be used or put away. Once the RIPMASTER is set up, it lacks the stability required to push a large workpiece through, making it susceptible to tipping over. It also lacks the all important out-feed work support. Without a out-feed support, the long workpiece becomes heavy on the out-feed end and tends to make the apparatus unbalanced.

TROJAN Manufacturing also offers another saw stand specifically for DEWALT's model DW-744 table saw. MS-2000X as seen in TOOL CRIB OF THE NORTH Catalog 904 (Jun. 1, 1999) refers to this new stand. It too, as does the RIPMASTER lacks the out-feed support. It does have wheels for transport, but the handle used for transport is low and some users may have to stoop uncomfortably to reach it, possibly causing undue back strain. Also, the legs must be taken off to take it down and put back on for set up. This makes it inconvenient for portability as it must be assembled each time it is set up and unassembled to take it down.

U.S. Pat. No. 4,955,941 to Tony Rousseau (Jul. 11, 1990) refers to a stand for portable table saws marketed by ROUSSEAU Company. This stand too, is cumbersome to set up and transport. It also lacks wheels for easy transportability. An optional out-feed support is available as an add-on device, but this add-on apparatus is cumbersome to attach each time of use and detracts from portability. It also adds expense to purchase the entire apparatus.

Both of TROJAN Manufacturing's table saw stands as well as ROUSSEAU's lacks the stability required for pushing a larger workpiece through the saw. Each of these designs require the workpiece to be pushed across the direction of the legs of the stand, or sideways. This is not as stable as a design such as the current invention in which the user pushes the workpiece directly against the support structures, or legs.

SUMMARY OF THE INVENTION

In a first aspect, the invention provides a collapsible stand for supporting a machining tool, comprising: a lateral support structure for holding the machining tool; a secondary support frame having a first end pivotally attached to a first end the lateral support structure; and a main support frame pivotally attached to the secondary support frame, wherein the main support frame comprises a handle at a first end for transporting the stand in its collapsed position, and wherein the handle comprises an out feed support for the machining tool when the stand is in its set up position.

In a second aspect, the invention provides a collapsible stand for supporting a tool, comprising: a lateral support structure for supporting the tool; and a main frame support having a handle for transporting the stand in a collapsed position, wherein the handle provides an out feed support for the tool in a set-up position.

In a further aspect, the invention provides an apparatus for carrying and supporting a portable bench top machining tool, said bench top machining tool having a predetermined means for fastening to a planar surface thereof, the apparatus comprising:

(a) a relatively rigid main support frame, said main support frame including two substantially parallel rails;

(b) a out-feed work support consisting of a member attached substantially perpendicular to and at first ends of said parallel rails of said main support frame for either or both purposes of supporting a long workpiece as it is passed through said portable bench top machining tool and as a handle for when said apparatus is being transported or otherwise handled;

(c) a secondary support frame for supporting said apparatus during use; said secondary support frame including two substantially parallel rails and a cross rail positioned substantially perpendicular to and near first ends of said parallel rails of said secondary support frame;

(d) a set of pivotal connections joining each said parallel rail of said secondary support frame at approximate mid points of each said parallel rail of said secondary support frame with each corresponding said parallel rail of said main support frame, at a point between the mid points and the second ends of said parallel rails of said main support frame;

(e) a platform including a planar surface for the purpose of fastening the bench top machining tool; first end of said platform being pivotally connected to second end of said parallel rails of said secondary support frame; and (f) a means for removably affixing, demountably connecting, releasably latching or otherwise temporarily securing second end of said platform to said main support frame at a point such that said platform will rest relatively parallel to ground plane when said apparatus is set-up for use whereby the user shall be provided with a conveniently collapsible, stable and safe support structure to accommodate the machining tool.

Accordingly, several advantages of the invention are:

(i) Ease of operation. The current invention is collapsible and can be set up with a minimum of time and effort. There are no removable parts that must be assembled and unassembled between usage. Simply snap it together to collapse and unsnap to set up.

(ii) Mobility. The invention is easily transportable with a pair of large wheels that easily roll over the ground and even up steps.

(iii) Out-feed support. The invention incorporates a out-feed work support structure that supports the weight of a long workpiece. This feature eliminates the need for the user to bear down on the in-feed portion of the workpiece with his hands being close to the blade, in order to prevent the workpiece from falling. It also reduces the likeliness of the saw and stand tipping over from the weight of the out-feed workpiece.

(iv) Simple design. The invention utilizes a simple design which is economical to fabricate and easily used.

(v) Simplicity and convenience of use which makes using this saw stand more efficient and thus more profitable for professional trades people.

Still further objects and advantages will become apparent from a consideration of the ensuing description and accompanying drawings.

DETAILED DESCRIPTION OF THE INVENTION

Figure 1:
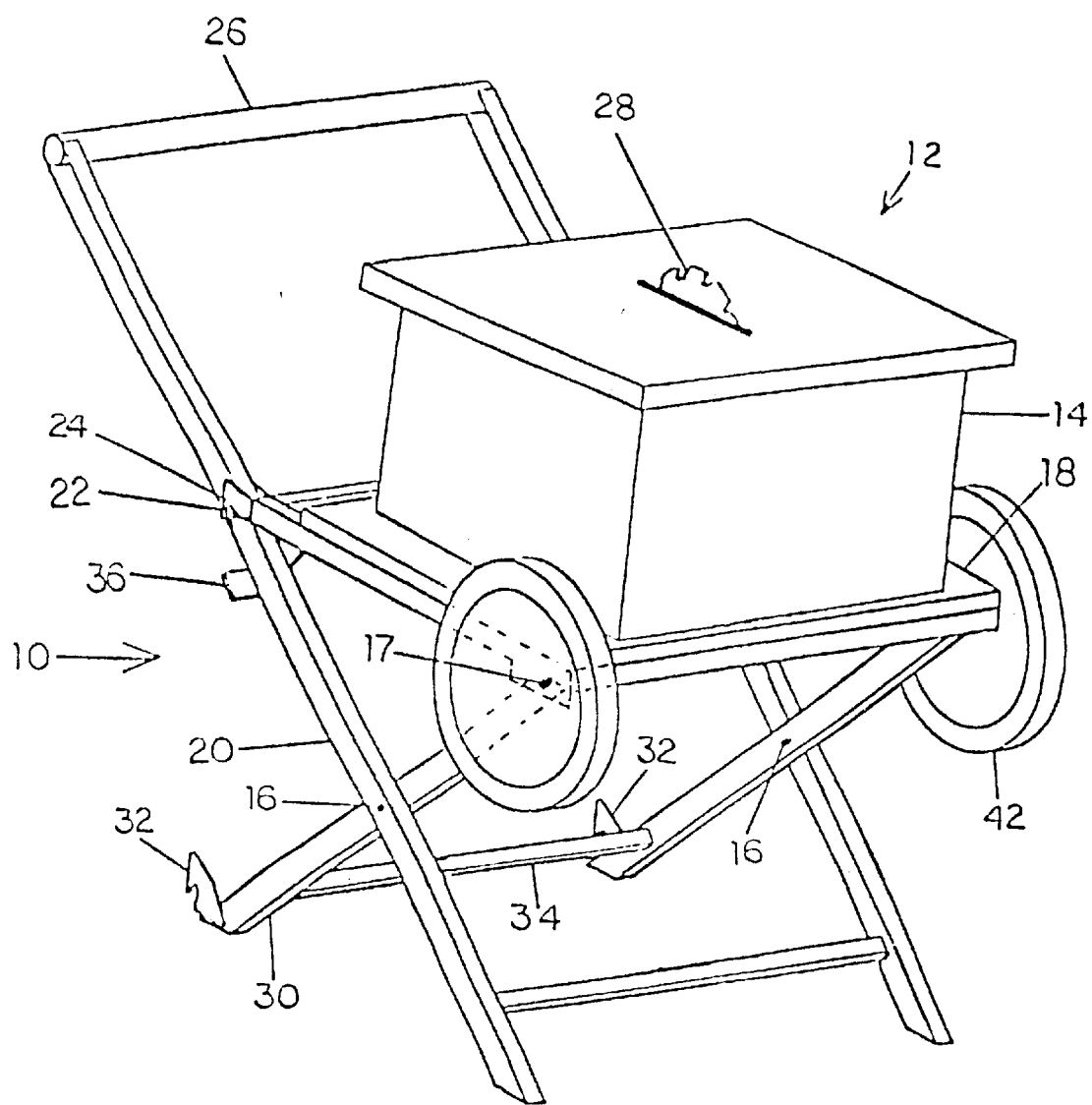
FIG. 1 is an isometric view of my invention in the set-up position, with a table saw affixed and ready for use.

Referring to FIGS. 1 through 4, an apparatus 10 is employed for carrying and supporting a portable table saw 12. The saw 12 can be one of a number of commercially available makes and models of portable table saws, such as but not limited to those manufactured by such companies known as DEWALT, BLACK & DECKER, HITACHI, DELTA, MAKITA, RYOBI, SKIL, and CRAFTSMAN. The saw 12 generally has a body 14 including provision for attachment to a bench, table or frame at bottom of body 14 thereof. Typically, the body 14 is fastened by means of a threaded screw attachment to the bench, table or frame. This threaded screw method of fastening is well known in the existing art of fastening and therefore is not specified in detail. However, other methods, as known in the art of fastening may be employed without departing from the principles of the invention.

The apparatus 10 includes a main support frame 20 which is pivotally connected to a secondary support frame 30 via two pivotal connections 16. These pivotal connections 16 may be one of several methods as is well known in the art of pivotal connections and therefore are not specified in detail.

Figure 2:
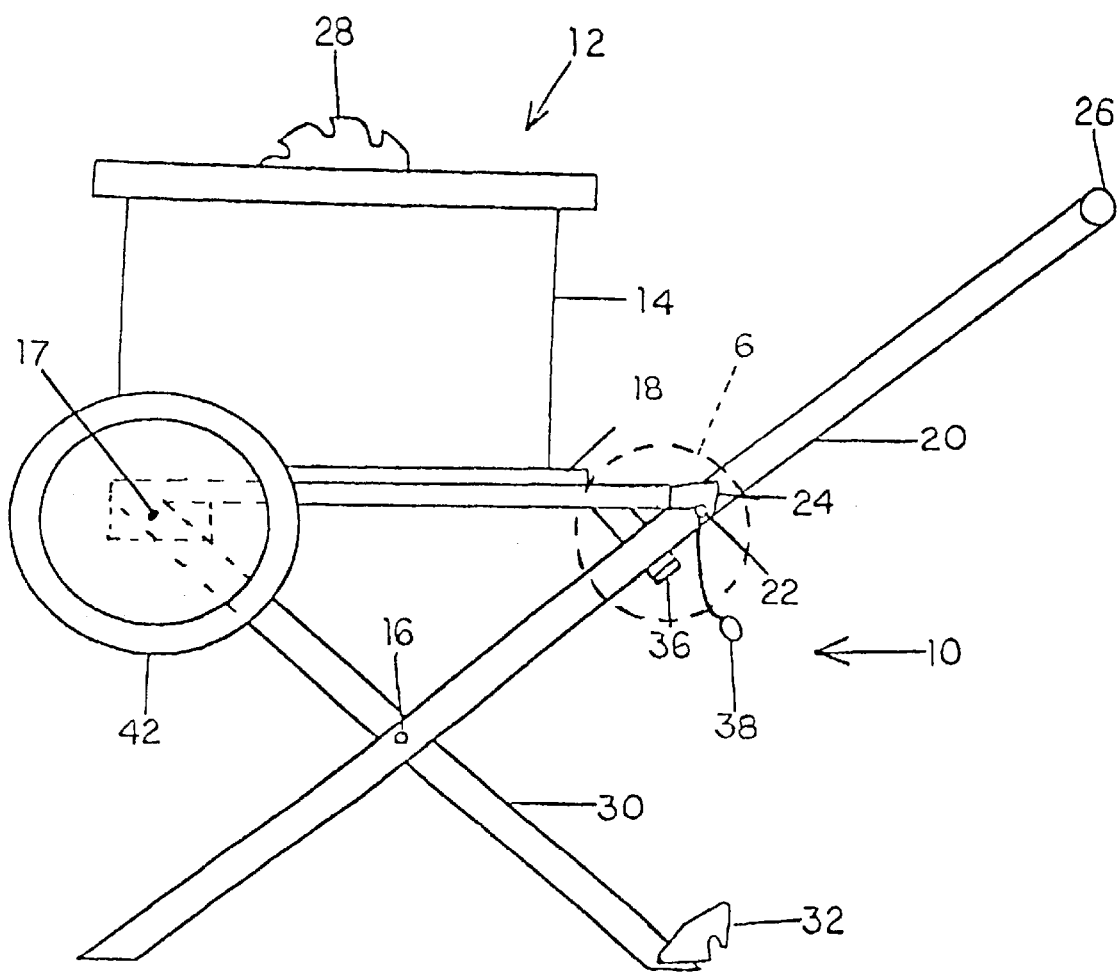
FIG. 2 is an orthogonal view of my invention in the set-up position with a table saw affixed and ready for use.

The main support frame 20 includes a pair of identical pins 22 for supporting a platform 18 when apparatus 10 is in the set-up position, as can be seen best in FIGS. 1 & 2. Although this preferred embodiment is described comprising a platform 18, it should be understood that any type of lateral support structure, such as platform 18, crossbar(s), brace, frame, etc., could be utilized to support saw 12 and therefore fall within the scope of this invention.

Figure 3:
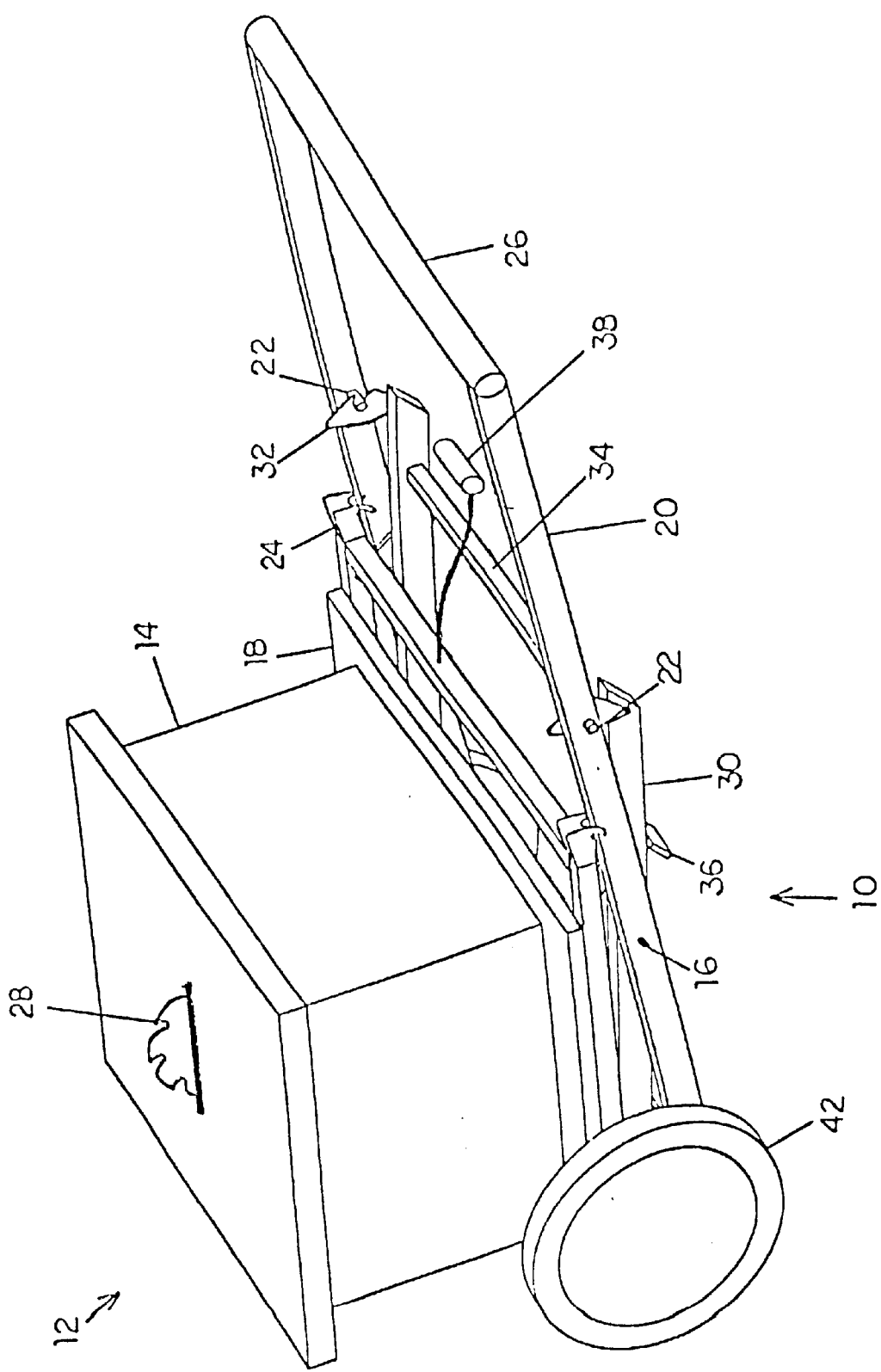
FIG. 3 is an isometric view of my invention in the collapsed position with table saw affixed and ready for transport.
Figure 4:
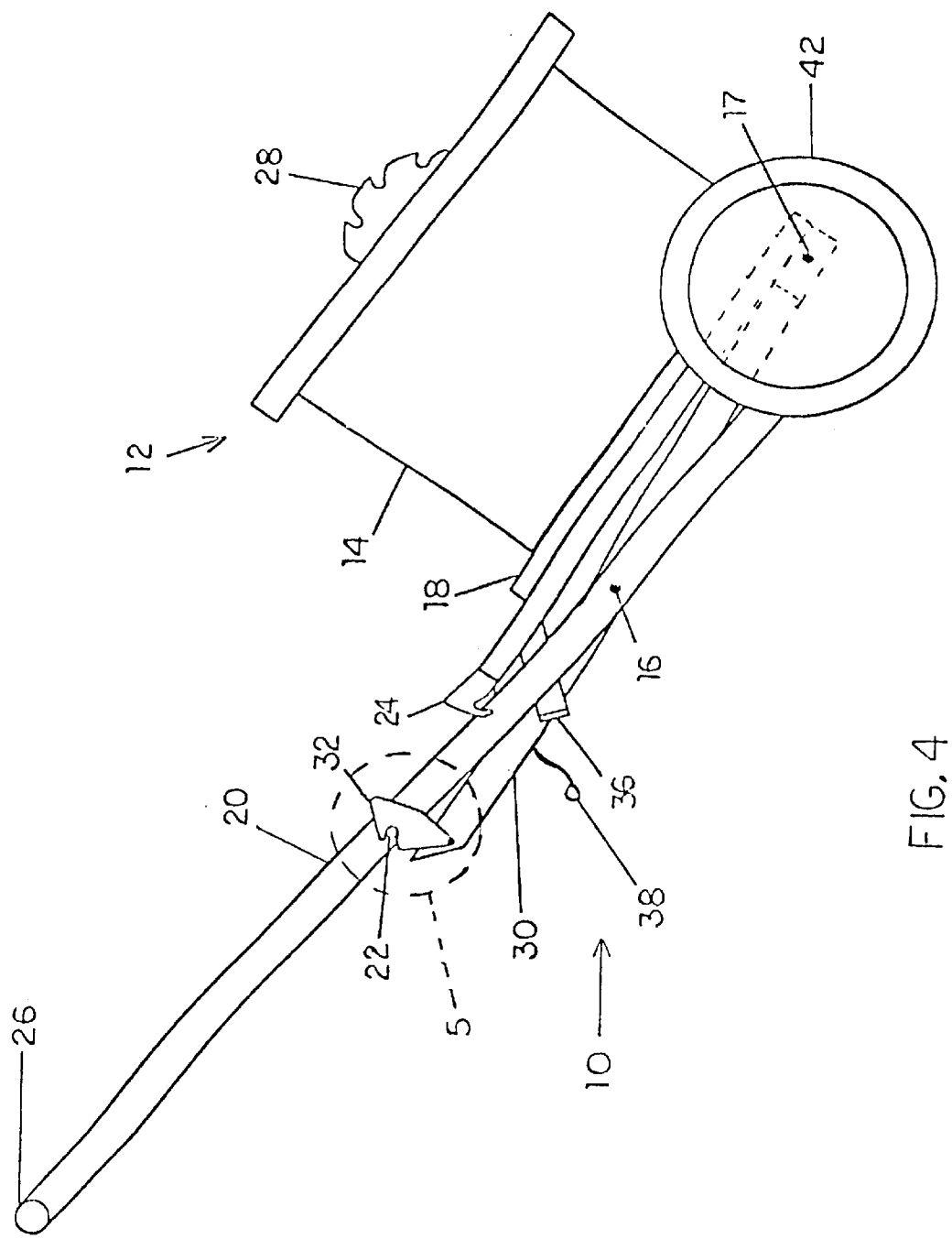
FIG. 4 is an orthogonal view of my invention in the collapsed position with table saw affixed and ready for transport.

The main support frame 20 also includes an out-feed work support 26 which is to support an object after it is fed through the saw blade 28 at which point the object extends past the edge of saw 12. The out-feed work support 26 is positioned to be in the same plane as the top of the saw 12 when apparatus 10 is in the set-up position. This can be seen more clearly in FIG. 2. The out-feed work support 26 is also used as a handle while apparatus 10 is being transported as can be seen in FIGS. 3 & 4. To achieve the correct height of the out-feed work support 26 in relation to the top of the saw 12, shims may be placed below saw 12 to raise or lower it as necessary. Alternatively, a mechanical system (e.g., a jack or a lift) could be used to raise or lower the saw. In addition, the out-feed work support 26 could be extendable (e.g., telescoping) to adjust its height.

Figure 5:
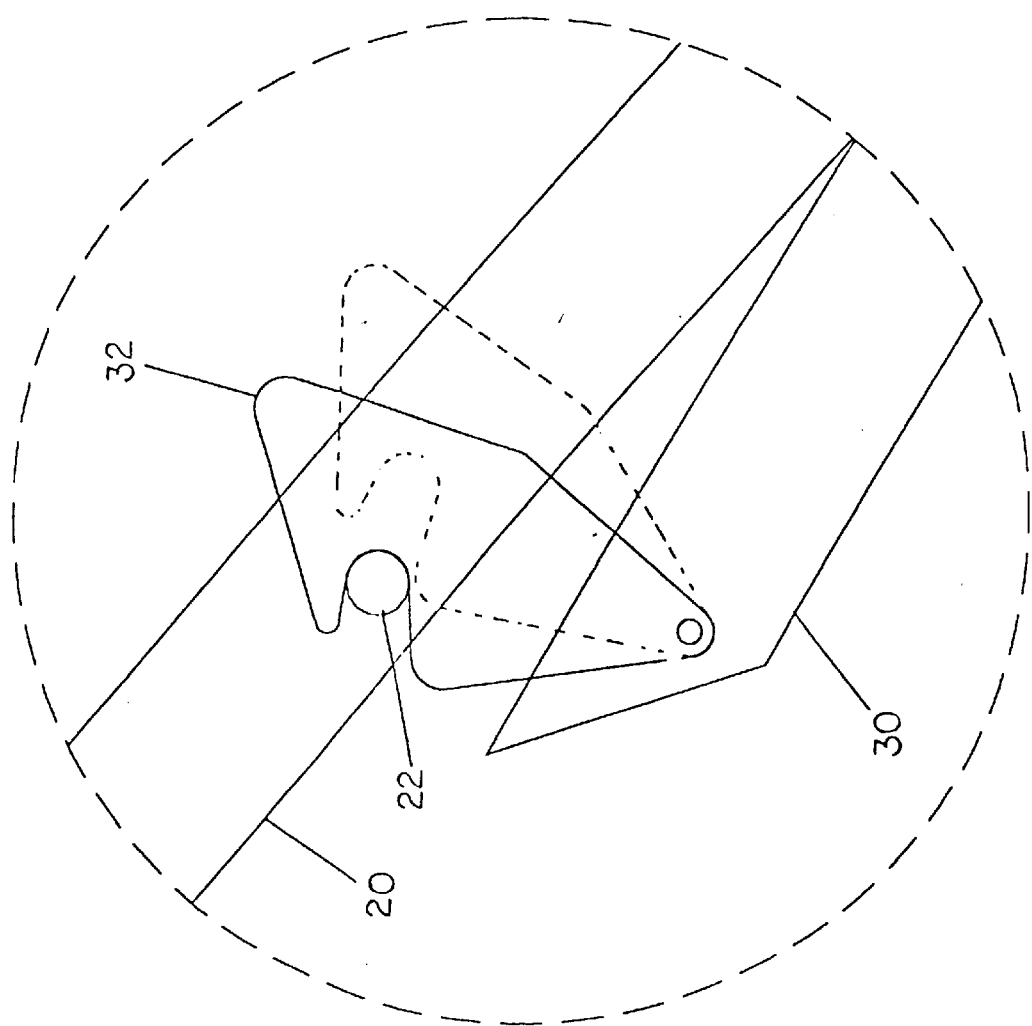
FIG. 5 is a close-up view of a transport latch.

The secondary support frame 30 includes a pair of identical latching mechanisms, transport latches 32 on each side of the secondary support frame 30, as can be seen in FIG. 1. The transport latches 32 are each shaped and placed precisely so as to engage with pins 22 when the apparatus 10 is in the collapsed position as can be seen in FIGS. 3 & 4. Most preferably, the transport latches 24 include spring tension and are designed such that during the process of collapsing the apparatus 10, the latches will be guided by pins 22 to swing over the pins and the spring tension will then snap the latches onto the pins. FIG. 5 is an expanded view of transport latch 32 and pin 22 when apparatus 10 is collapsed as shown by the dashed circle 5 in FIG. 4. The secondary support frame 30 also includes a cross rail 34 as can be seen in FIG. 1.

Two pivotal connections 17 are provided to connect the platform 18 to the secondary support frame 30 as may be seen in FIG. 1. These pivotal connections 17 may be one of several methods as is well known in the art of pivotal connections and therefore are not specified in detail.

Figure 6:
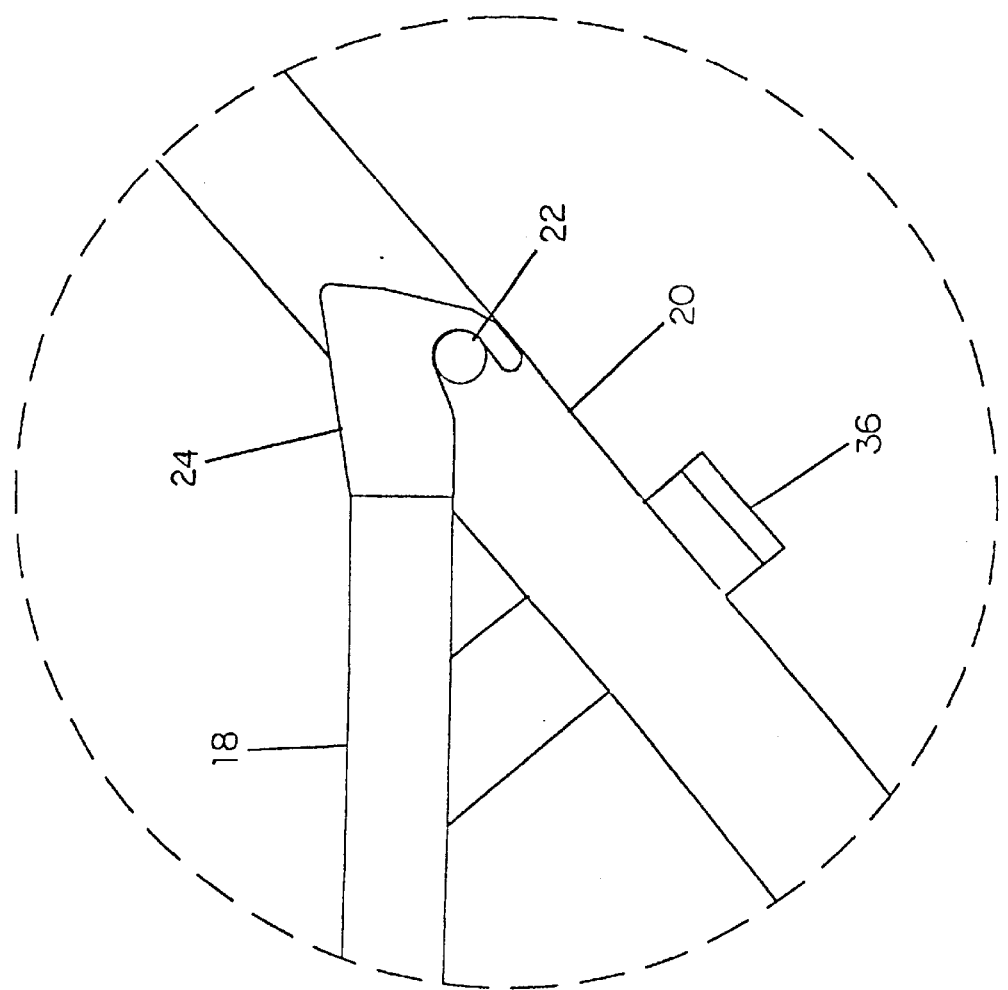
FIG. 6 is a close up view of a set-up latch.

The platform 18 includes a pair of identical latch devices, set-up latches 24. Set-up latch 24 is best shown in FIG. 2. Another set-up latch is identical to and placed directly opposite set-up latch 24 on platform 18. Set-up latches 24 are both precisely shaped and placed so as to engage with pins 22 when apparatus 10 is in the set-up position as can be seen in FIGS. 1 & 2. FIG. 6 is an expanded view of a set-up latch 24 and pin 22 when apparatus 10 is in the set-up position as shown by the dashed circle 6 in FIG. 2.

The platform 18 also includes a pair of devices, retainers 36, that are slidably engaged to main frame support 20. Each retainer 36 is shaped and sized so as to keep platform 18 loosely connected to apparatus 10 when apparatus 10 is in the collapsed position as well as provide adequate clearance to engage the set-up latches 24 to pins 22 during the set-up process.

The platform 18 contains a surface for which to affix the saw 12. This surface may be formed of some rigid durable material of relatively low mass, such as but not limited to plywood, particle board, or plastic. Other rigid materials fulfilling the specified requirements will serve the purpose of the surface as well.

The platform 18 includes a setup handle 38. The setup handle 38 may be constructed of one of many means so as to provide the necessary function. Preferably, it is connected to platform 18 by means of a flexible tether, such as but not limited to, rope, string, cable or wire. Other means of attachment as is well known in the art of attachment may also be used.

The apparatus 10 also includes a pair of wheels 42 mounted proximate the pivot connection of platform 18 and secondary support 30.

OPERATION

The use and operation of the invention is as follows:

The operator uses out-feed work support 26 as a handle while in transit when apparatus 10 is in transport mode as can be seen in FIGS. 3 and 4 (i.e., the "collapsed position"). When the operator wishes apparatus 10 to be set-up, he/she continues to hold out-feed work support 26 with one hand and grasps setup handle 38 with the other. The operator then places one foot on cross rail 34 and proceeds to pull setup handle 38 while simultaneously pushing cross rail 34 downward with foot. This process is continued until both set-up latches 24 are lifted up and over each of pins 22 until set-up latches 24 are able to clear over pins 22. The operator then eases tension on setup handle 38 and cross rail 34 in such manner so as to engage set-up latches 24 with pins 22. The set-up operation is now complete and apparatus 10 is ready for use (i.e., it is in the "set-up position"). In the set-up position, the handle on main frame support 26 resides at the same height as the saw top to provide the out-feed support for the saw 12.

To collapse apparatus 10, the operator simply reverses the set-up procedure. Apparatus 10 will then be supported by wheels 42 and will be ready for transport and/or stowage.

Accordingly, it can be seen that, according to the invention, an apparatus is provided for the purpose of supporting and carrying a portable table saw. The invention is easy to use. It is quick to set up and collapse for storage and possesses ease of mobility utilizing a set of wheels. It provides a stable means of support which helps to provide a safe work environment for the operator.

Although the description above contains many specifics, these should not be construed as limiting the scope of the invention but as merely providing illustrations of some of the presently preferred embodiments of this invention. Various other embodiments and ramifications are possible within it's scope. For example, the out-feed work support 26 may be adjustable in height so as to accommodate many different makes and models of saw 12. This would provide for economical manufacture. The platform 18 may include "shim blocks" to raise the height of saw 12. Other means and methods may be employed to substitute the function of retainers 36, as long as the method does not depart from the principles of the invention. Various connection and latching means may be employed throughout that serve the necessary function without departing from the principles of the invention. In addition, although the collapsible table is described with reference to a table saw, it should be understood that the table could be used along with any type of tool (e.g., a cutting, sanding, grinding, mitering or milling device) in which an out feed support is useful.

What is claimed is:

1. A collapsible stand for supporting a machining tool, comprising:

a lateral support structure for holding the machining tool;

a secondary support frame having a first end pivotally attached to a first end of the lateral support structure; and a main support frame pivotally attached to the secondary support frame, wherein the main support frame comprises a handle at a first end for transporting the stand in its collapsed position, wherein the handle comprises an out feed support for the machining tool when the stand is in its set up position, and wherein the main support frame and the secondary support frame collapse in opposing directions.

2. The collapsible stand of claim 1, wherein the lateral support structure comprises a platform.

3. The collapsible stand of claim 1, wherein the secondary support frame provides support to the first end of the lateral support structure when the stand is in its set up position.

4. The collapsible stand of claim 1, wherein the secondary support frame folds beneath the lateral support structure when the stand in its collapsed position.

5. The collapsible stand of claim 1, wherein main support frame provides support to a second end of the lateral support structure when the stand is in its set up position.

6. The collapsible stand of claim 5, wherein the second end of the lateral support structure is slidably engaged to the main support frame and includes a locking mechanism for securing the lateral support structure to the main support frame.

7. The collapsible stand of claim 1, further comprising a pair of wheels attached proximate the first end of the lateral support structure.

8. The collapsible stand of claim 7, wherein the stand collapses into a relatively flat configuration such that the handle and pair of wheels reside at opposed ends of the stand.

9. The collapsible stand of claim 8, further comprising a releasable latch for securing said stand in the collapsed position.

10. The collapsible stand of claim 1, further including a setup handle attached to a second end of the lateral support structure for facilitating collapse and setup of the stand.

11. A collapsible stand for supporting a machining tool, comprising:

a lateral support structure for holding the machining tool having a first end and a second end;

a pair of wheels attached proximate the first end;

a secondary support frame pivotally attached to the first end; and a main support frame pivotally attached to the secondary support frame, wherein the main support frame comprises a handle at a first end for transporting the stand in its collapsed position, and wherein the handle comprises an out feed support for the machining tool in a set-up position.

12. The stand of claim 11, wherein the main support frame detachably supports the second end in the set up position.

13. The stand of claim 11, further comprising a releasable latch for securing said stand in the collapsed position.

14. The stand of claim 11, wherein the handle is extendable.

15. A collapsible stand for supporting a tool, comprising:
a lateral support structure for supporting the tool; and
a main support frame having a handle for transporting the stand in a collapsed position, wherein the handle provides an out feed support for the tool in a set-up position, and wherein the main support frame is substantially planar in the set-up position.

16. The collapsible stand of claim 15, wherein the main support frame includes a releasable locking mechanism for securing the lateral support structure to the main frame support in the setup position.

17. The collapsible stand of claim 15, wherein the main support frame folds relatively parallel to the lateral support structure in the collapsed position.

18. The collapsible stand of claim 15, further comprising a secondary support frame with a first location pivotally attached to the lateral support structure and a second location pivotally attached to the main frame support.

19. The collapsible stand of claim 18, further comprising a wheel mounted proximate the first location of the secondary support frame.

20. The collapsible stand of claim 15, wherein the handle is extendable.

* * * * *